(12) United States Patent
Hong

(10) Patent No.: US 12,476,876 B2
(45) Date of Patent: Nov. 18, 2025

(54) NETWORK FUNCTION MONITORING AND DATA COLLECTION

(71) Applicant: ZTE Corporation, Guangdong (CN)

(72) Inventor: Yingjie Hong, Guangdong (CN)

(73) Assignee: ZTE Corporation, Guangzhou (CN)

( * ) Notice: Subject to any disclaimer, the term of this patent is extended or adjusted under 35 U.S.C. 154(b) by 559 days.

(21) Appl. No.: 18/054,682

(22) Filed: Nov. 11, 2022

(65) Prior Publication Data

US 2023/0071081 A1    Mar. 9, 2023

Related U.S. Application Data

(63) Continuation of application No. PCT/CN2020/089567, filed on May 11, 2020.

(51) Int. Cl.
*H04L 41/142* (2022.01)
*H04L 41/147* (2022.01)
(Continued)

(52) U.S. Cl.
CPC .......... *H04L 41/142* (2013.01); *H04L 41/147* (2013.01); *H04L 41/149* (2022.05);
(Continued)

(58) Field of Classification Search
CPC ... H04L 41/142; H04L 41/147; H04L 41/149; H04L 43/04; H04W 24/02; H04W 24/08; Y02D 30/70
See application file for complete search history.

(56) References Cited

U.S. PATENT DOCUMENTS

2020/0045559 A1    2/2020   Kim et al.
2023/0147094 A1*   5/2023   Kahn ................. H04L 41/5054
                                                        726/27

FOREIGN PATENT DOCUMENTS

| CN | 110312279   | 10/2019 |
| CN | 110677299   | 1/2020  |
| WO | 2020/066890 | 4/2020  |

OTHER PUBLICATIONS

Huawei et al. ("Data Collection Coordination for Multiple NWDAF Instances" 3GPP Draft; S2-2000423, 3rd Generation Partnership Project (3GPP); Incheon, South Korea; Jan. 13, 2020-Jan. 17, 2020 Jan. 7, 2020 (Jan. 7, 2020), XP051842493, document submitted in record on Nov. 11, 2022; hereinafter HUA423). (Year: 2020).*

(Continued)

*Primary Examiner* — Michael A Keller
(74) *Attorney, Agent, or Firm* — Perkins Coie LLP

(57) ABSTRACT

Methods, apparatuses, and systems for providing and maintaining data analytics and data collection as a mobile device disconnects from one network function and connects to another network function. In one aspect, a wireless communication method is disclosed. The method includes receiving, by a first network function operating in a core network of a wireless communication system in which data analytics information or data collection is provided, a notification of a data source change from a first data source to a second data source. The method further includes determining, by the first network element, a second network function associated with the second data source, and transmitting, by the first network function, a request to the second network function for the data analytics information or data collection. The method includes receiving the data analytics information or data collection from the second network function.

10 Claims, 17 Drawing Sheets

(51) Int. Cl.
  *H04L 41/149* (2022.01)
  *H04L 43/04* (2022.01)
  *H04W 24/02* (2009.01)
  *H04W 24/08* (2009.01)
(52) U.S. Cl.
  CPC .............. *H04L 43/04* (2013.01); *H04W 24/02* (2013.01); *H04W 24/08* (2013.01)

(56) References Cited

OTHER PUBLICATIONS

Huawei et al. ("Solution to multiple NWDAF instances", 3GPP Draft; S2-2000854, 3rd Generation Partnership Project (3GPP), Mobile Competence Centre; Incheon, Korea; Jan. 13, 2020-Jan. 17, 2020 Jan. 7, 2020 (Jan. 7, 2020), XP051842908; hereinafter HUA854). (Year: 2020).*

Office Action for Co-Pending KR Application No. 10-2022-7039574, dated Mar. 21, 2024 (11 pages with unofficial English summary).

Huawei, et al. "Solution to multiple NWDAF instances" SA WG2 Meeting #136AH S2-2000854, Jan. 13-17, 2020, Incheon, Korea, 4 pages.

Huawei, et al. "Data Collection Coordination for Multiple NWDAF Instances" SA WG2 Meeting #136AH S2-2000423, Incheon, South Korea, Jan. 13-17, 2020, 3 pages.

International Search Report and Written Opinion International Application No. PCT/CN2020/089567, dated Jul. 7, 2020 (10 pages).

Huawei, et al., "Mega CR on editorial corrections" 3GPP TSG-WG SA2 Meeting #135 S2-2002449, Elbonia, Feb. 24-27, 2020 (revision of S2-2001853), 20 pages.

Huawei, et al., "Solution to multiple NWDAF instances" SA WG2 Meeting #136AH S2-2001210 Jan. 13-17, 2020, Incheon, Korea (merge of S2-2000854, 2000167), 7 pages.

Ericsson, "Solution on how to find an associated NWDAF" 3GPP SA WG2 Meeting #138E S2-20xxxx, May 25-28, 2020, Elbonia (Revision of S2-200167), 6 pages.

Huawei, et al., Solution to Interactions of Hierarchical NWDAFs for Analytics Generation related to Large Areas, 4 SA WG2 Meeting #139E S2-200xxxx, Elbonia, May 25-29, 2020, 9 pages.

Notification of Registration and Grant for Chinese Application No. 202080100787.2, dated Nov. 1, 2024, 4 pages, with English translation.

Notice of Allowance for Korean Patent Application No. 10-2022-7039574, dated Nov. 7, 2024, 7 pages, with English translation.

Office Action for Co-Pending CN Application No. 202080100787.2, dated May 31, 2024 (23 pages with unofficial English summary).

Extended European Search Report for Co-Pending EP Application No. 20895713.4, dated May 8, 2023 (14pages).

Ericsson, "Solution on KI#2" 3GPP SA WG2 Meeting #138E S2-20xxxx, Jun. 1-12, 2020, Elbonia (Revision of S2-200167), 4 pages.

* cited by examiner

1400

Receiving, by a first network function operating in a core network of a wireless communication system in which data analytics information or data collection is provided, a notification from a second network function of a data source change from a first data source to a second data source — 1410

Determining, by the first network function, from the received notification a third network function associated with the second data source — 1420

Transmitting, by the first network function, a request to the third network function for the data analytics information or data collection; and — 1430

Receiving, by the first network function, the data analytics information or data collection from the third network function — 1440

```
┌─────────────────────────────────────────────────┐
│ Determining, by a first network function operating in a │
│ core network of a wireless communication system in │      1510
│ which data analytics information or data collection is │
│ provided, a second network function associated with │
│           the second data source                │
└─────────────────────────────────────────────────┘
                        │
┌─────────────────────────────────────────────────┐
│ Transferring a request to data analytics information or │
│ data collection received from a third network function │    1520
│ related to a mobile device from the first network function │
│           to the second network function        │
└─────────────────────────────────────────────────┘
                        │
┌─────────────────────────────────────────────────┐
│ Transmitting, by the first network function to the third │  1530
│     network function, a notification of the transferring │
└─────────────────────────────────────────────────┘
                        │
┌─────────────────────────────────────────────────┐
│ Receiving, the data analytics information or collection │   1540
│         data from the second network function   │
└─────────────────────────────────────────────────┘
```

FIG.15

NETWORK FUNCTION MONITORING AND DATA COLLECTION

CROSS-REFERENCE TO RELATED APPLICATION

This application is a continuation and claims priority to International Application No. PCT/CN2020/089567, filed on May 11, 2020, the disclosure of which is hereby incorporated by reference herein in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as data analytics, energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for providing and maintaining data analytics and data collection as a mobile device disconnects from one network function and connects to another network function.

In one aspect, a wireless communication method is disclosed. The method includes receiving, by a first network function operating in a core network of a wireless communication system in which data analytics information or data collection is provided, a notification of a data source change from a first data source to a second data source. The method further includes determining, by the first network element, a second network function associated with the second data source, and transmitting, by the first network function, a request to the second network function for the data analytics information or data collection. The method includes receiving the data analytics information or data collection from the second network function.

In another aspect, another wireless communication method is disclosed. The method includes receiving, by a first network function operating in a core network of a wireless communication system in which data analytics information or data collection is provided, a notification from a second network function of a data source change from a first data source to a second data source. The method further includes determining, by the first network function, from the received notification a third network function associated with the second data source, and transmitting, by the first network function, a request to the third network function for the data analytics information or data collection. The method includes receiving, by the first network function, the data analytics information or data collection from the third network function.

In another aspect, another wireless communication method is disclosed. The method includes determining, by a first network function operating in a core network of a wireless communication system in which data analytics information or data collection is provided, a second network function associated with the second data source. The method further includes transferring a request to data analytics information or data collection received from a third network function related to a mobile device from the first network function to the second network function. The method includes transmitting, by the first network function to the third network function, a notification of the transferring, and receiving the data analytics information or collection data from the second network function.

These, and other, aspects are described in the present document.

BRIEF DESCRIPTION OF DRAWINGS

FIG. 14 depicts another example of a method, in accordance with some example embodiments;

FIG. 15 depicts yet another example of a method, in accordance with some example embodiments;

DETAILED DESCRIPTION

Certain features are described using the example of Fifth Generation (5G) wireless protocol. However, applicability of the disclosed techniques is not limited to only 5G wireless systems.

Disclosed are techniques for providing and maintaining data analytics and data collection related to data analytics as a mobile device disconnects from one network function and connects to another network function. Data analytics are an important aspect for ongoing operation of a wireless network because it enables collection of information that is used by various hardware and software functions implemented by network operators and user devices for efficient operation.

To support network data analytics services in a core network, a network data analytics function (NWDAF) collects data from network functions (NFs) such as access and mobility management functions (AMFs), session management functions (SMFs), and so on. However, for each type of NF, there may be multiple NF instances deployed in different service areas. When the UE moves to a different service area, the NFs serving the UE may also change. For data collection from the NFs serving the UE, the NWDAF needs to know which NFs are serving the UE. Disclosed are techniques for obtaining the information of which NFs are serving the UE and for collecting data from the NFs.

Figure 1:
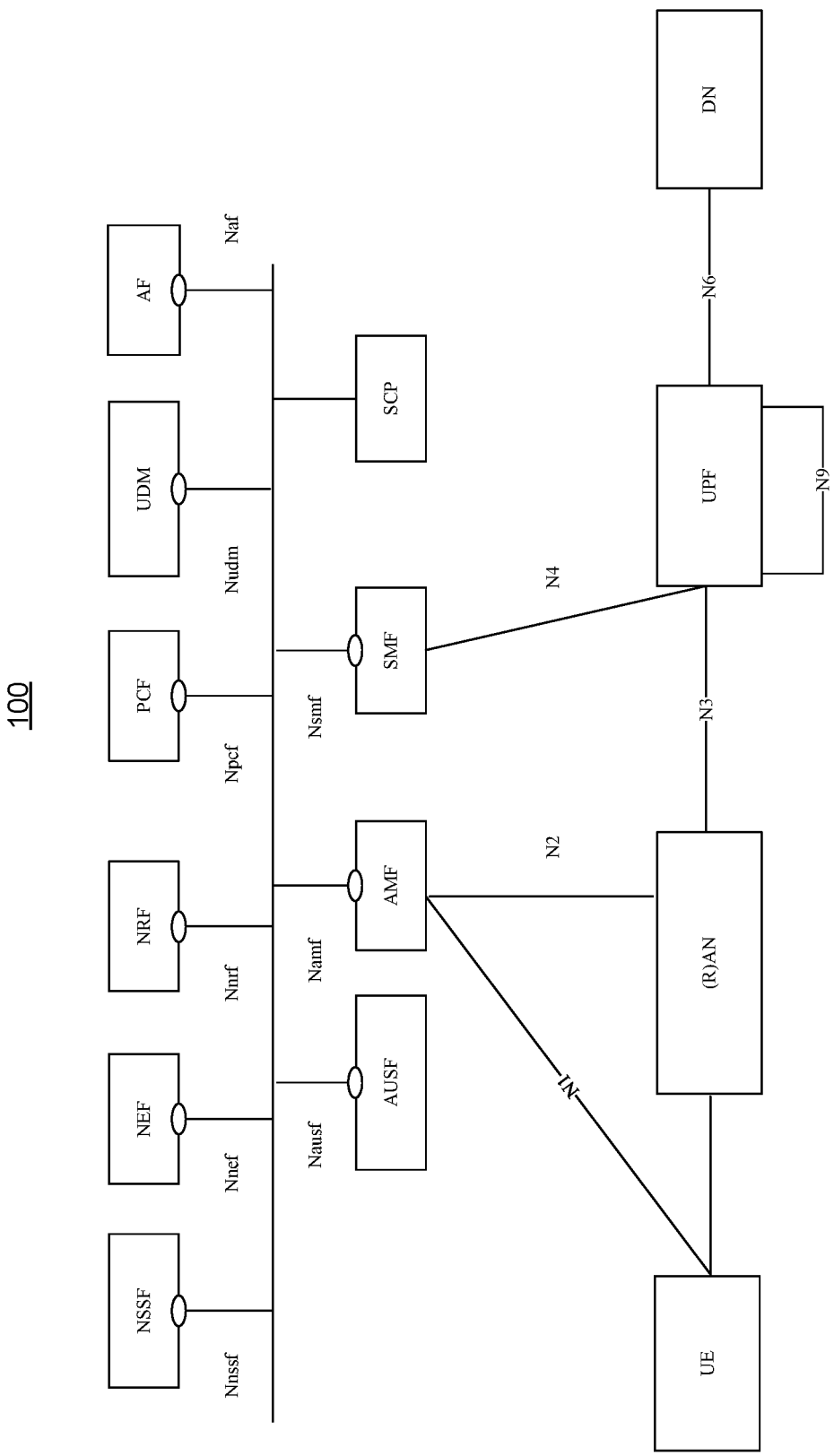
FIG. 1 depicts an example of a reference network architecture such as a non-roaming 5G architecture.

FIG. 1 depicts an example of a reference network architecture such as a non-roaming 5G architecture. Service-based interfaces are used within the control plane.

The 5G System architecture consists of the following network functions (NF). The 5G System architecture consists of the following network functions (NF).

Authentication Server Function (AUSF)
Access and Mobility Management Function (AMF)
Data Network (DN), e.g. operator services, Internet access or 3rd party services
Unstructured Data Storage Function (UDSF)
Network Exposure Function (NEF)
Intermediate NEF (I-NEF)
Network Repository Function (NRF)
Network Slice Selection Function (NSSF)
Policy Control Function (PCF)
Session Management Function (SMF)
Unified Data Management (UDM)
Unified Data Repository (UDR)
User Plane Function (UPF)
UE radio Capability Management Function (UCMF)
Application Function (AF)
User Equipment (UE) include devices such as cell phones, tablets, or other mobile devices.
(Radio) Access Network ((R)AN) includes base stations.
5G-Equipment Identity Register (5G-EIR)
Network Data Analytics Function (NWDAF)
CHarging Function (CHF)

The 5G System architecture also comprises the following network entities:

Service Communication Proxy (SCP)
Security Edge Protection Proxy (SEPP)
Non-3GPP InterWorking Function (N3IWF)
Trusted Non-3GPP Gateway Function (TNGF)
Wireline Access Gateway Function (W-AGF)
Data Collection Coordination Function (DCCF): coordinates data collection.

More details on the definitions of each network function shall refer to TS 23.501, which is incorporated by reference in its entirety.

A UE should register with the network to receive services that require registration. As a result of the registration procedure, an identifier of the AMF serving the UE will be registered at the UDM.

The 5G core network (5GC) supports PDU connectivity service such as a service that provides an exchange of PDUs between a UE and a data network identified by a DNN. The PDU connectivity service is supported via PDU sessions that are established upon request from the UE. The SMF is responsible of checking whether the UE PDU session establishment requests are compliant with the user subscription. For this purpose, the SMF retrieves and requests to receive update notifications about SMF level subscription data from the UDM. A UE may establish multiple PDU sessions to the same data network or to different data networks via access networks including 3GPP access networks and Non-3GPP access networks at the same time. A UE with multiple established PDU sessions may be served by different SMF. The SMF shall be registered and deregistered on a per PDU session granularity in the UDM.

Figure 2:
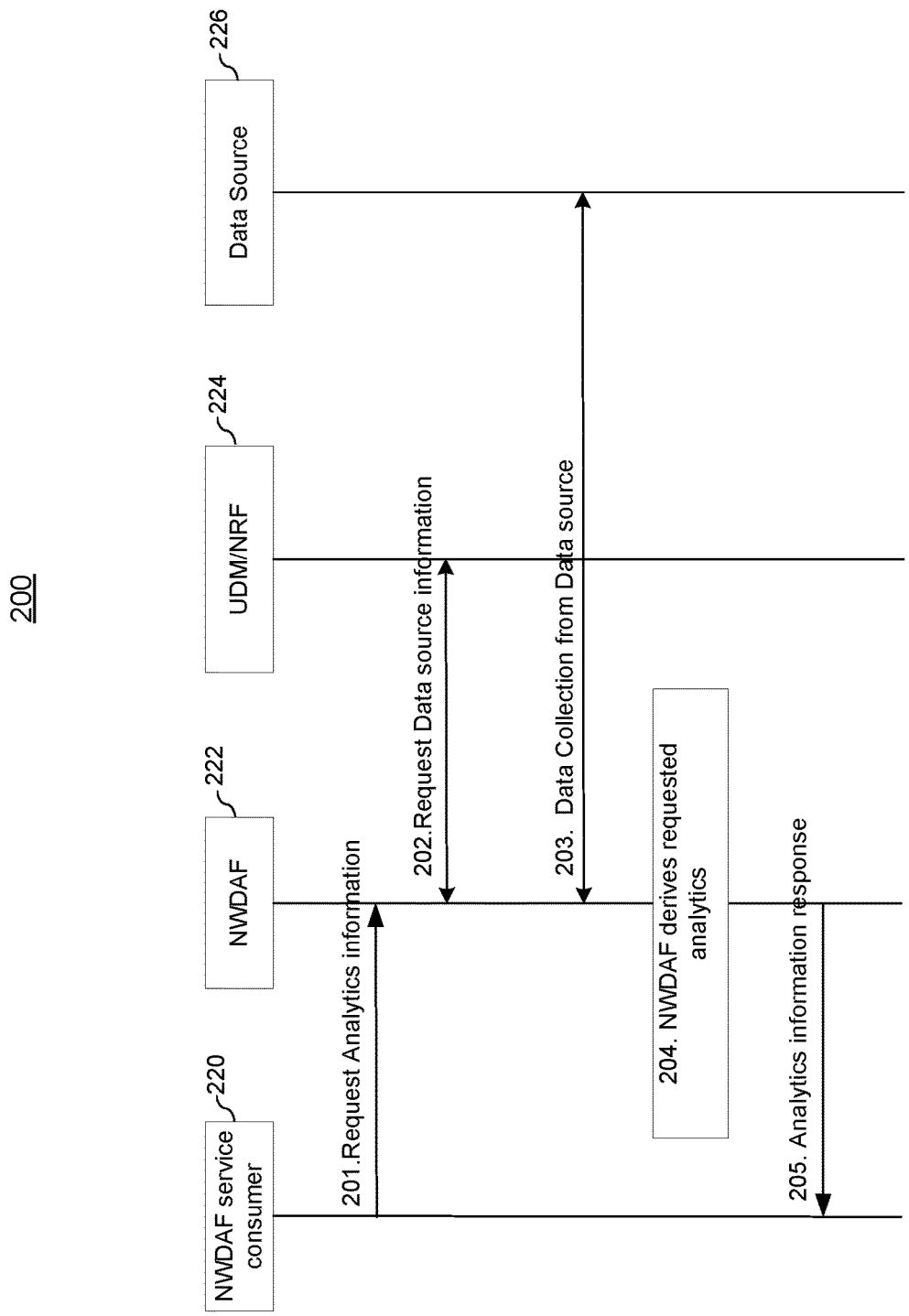
FIG. 2 depicts an example of a message procedure for a single network data analytics function (NWDAF), in accordance with some example embodiments.

In various wireless communications systems including 5G systems, a single instance or multiple instances of the NWDAF may be deployed in a PLMN. The NWDAF interacts with different entities for different purposes including:

Data collection based on subscription to events provided by an AMF, SMF, PCF, UDM, AF (directly or via NEF), and/or OAM;
Retrieval of information from data repositories such as, for example, UDR via UDM for subscriber-related information;
Retrieval of information about 3GPP NFs such as, for example, from an NRF for NF-related information;
Retrieval of information from the UE; and/or
On demand provisions of analytics information (e.g. statistics or predictions or both) to consumers (e.g. 3GPP NFs, AF or OAM);

FIG. 2 shows an example of a message procedure 200 that can apply to all types of analytics for a single NWDAF. As used herein, a data source may include 3GPP NFs, AF, OAM, and/or a UE whose own data or owned data could be collected and utilized.

At 201, a NWDAF service consumer (e.g. including NFs/OAM) 220 sends a request to the NWDAF 222 for analytics information including the type of requested analytics (e.g. UE mobility analytics, UE communication analytics, expected UE behavioral parameters related network data analytics, etc.) and/or other input parameters (e.g. the object(s) or area for which Analytics information is requested, etc.).

At 202, the request for analytics information is received at the NWDAF 222. The NWDAF 222 retrieves which data sources are serving the requested object(s) or area of interest from the UDM and/or NRF 224.

At 203, the NWDAF 222 retrieves data from various data sources 226.

At 204, the NWDAF 222 derives the requested analytics.

At 205, the NWDAF 222 responds to the NWDAF service consumer 220 with the analytics information.

Figure 3:
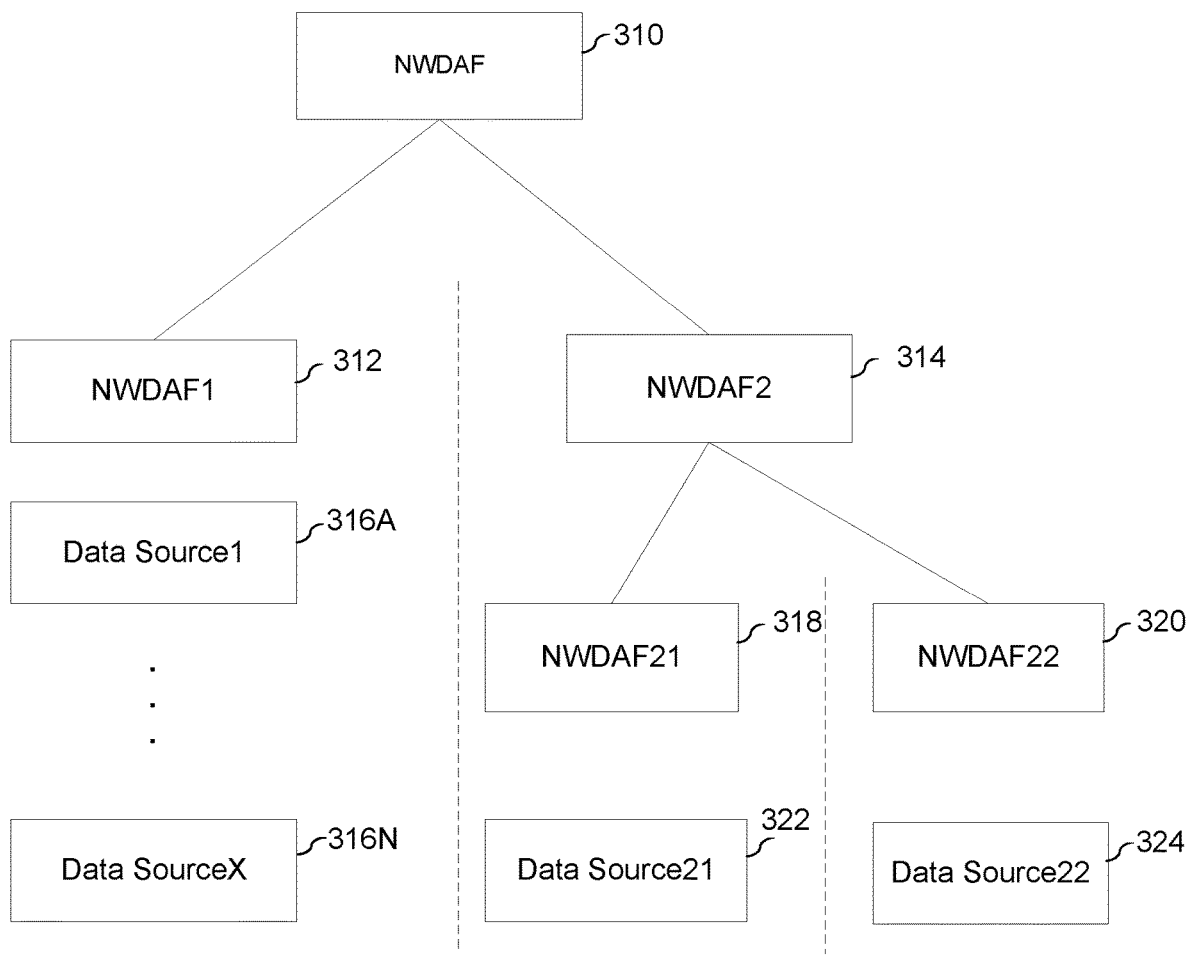
FIG. 3 depicts an example architecture with multiple NWDAFs, in accordance with some example embodiments.

FIG. 3 shows an example architecture with multiple NWDAFs. In the example of FIG. 3, NWDAF 310 (e.g. on slice level) requests analytic reports or data collection from one of the NWDAFs such as NWDAF 312 and/or NWDAF 314 but NWDAF 310 could be connected to a different number of NWDAFs. In the example of FIG. 3, NWDAF 312 requests data from one or more data sources 316A to 316N where each is serving a number of UEs, and NWDAF 314 requests data from lower NWDAFs 318 and 320 which are each connected to one or more data sources such as data sources 322 and 324, respectively. NWDAF 310 may be referred to as a higher level NWDAF above NWDAF1 312 and NWDAF2 314, and NWDAF1 312 and NWDAF2 314 may be referred to as lower level of NWDAFs below NWDAF 310. NWDAF2 314 is a higher level NWDAF above NWDAF21 318 and NWDAF22 320, and NWDAF21 318 or NWDAF22 320 are lower level NWDAFs below of NWDAF2 314.

Figure 4:
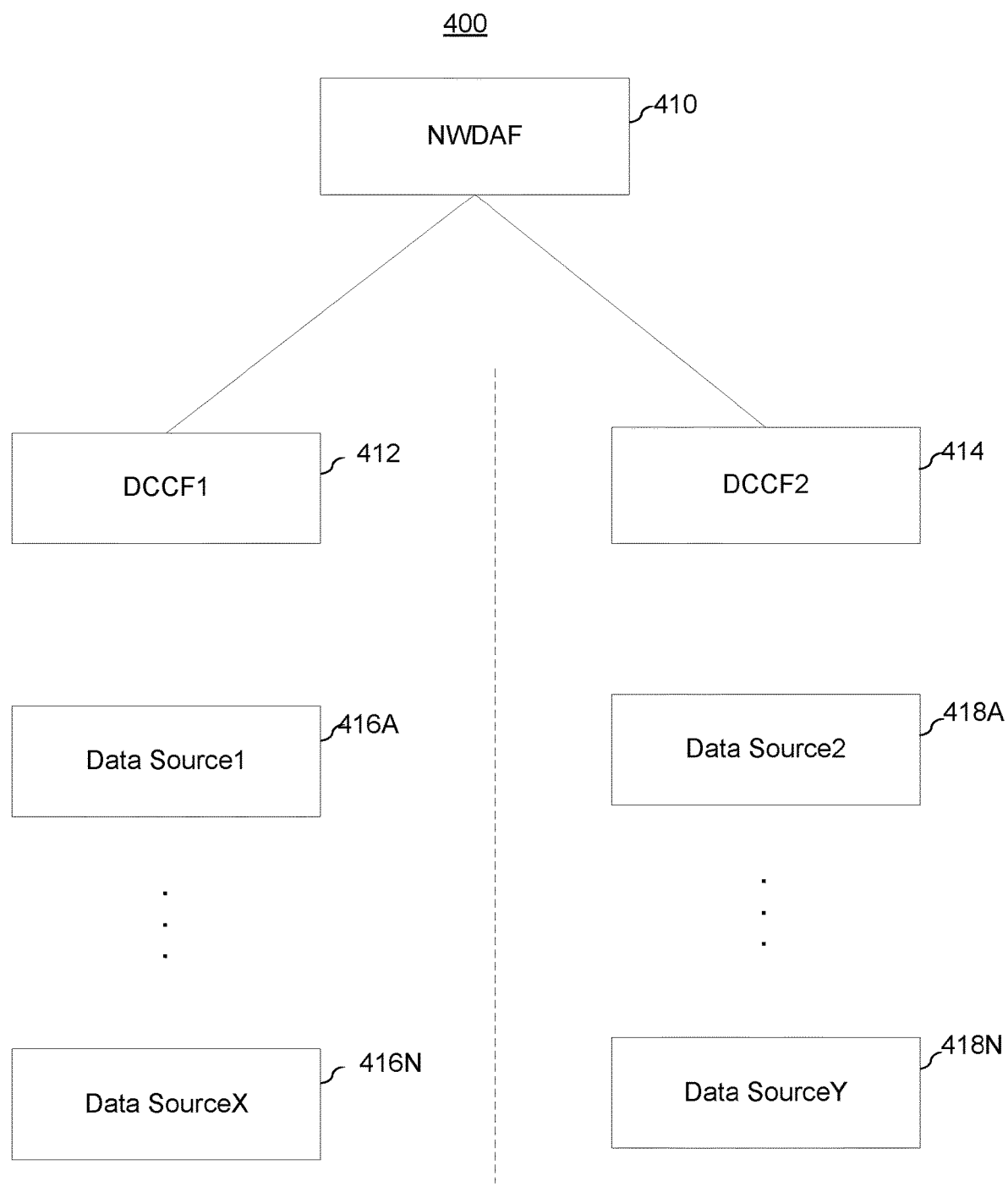
FIG. 4 depicts an example architecture with an NWDAF and multiple data collection coordination functions (DCCFs), in accordance with some example embodiments.

FIG. 4 shows an example architecture 400 with an NWDAF and multiple DCCFs. Shown in FIG. 4 are NWDAF 410 and DCCFs 412 and 414 but NWDAF 410 could be connected to a different number of DCCFs. In the example of FIG. 4, NWDAF 410 (e.g. on slice level) requests data from one of the multiple DCCFs such as DCCF 412 and/or DCCF 414 but NWDAF 410 could be connected to a different number of DCCFs. Each DCCF may serve a different data source according to a policy such as an operator configuration. DCCF 412 may receive data from one or more data sources such as data sources 416A-416N and DCCF 414 may receive data from one or more data sources such as data sources 418A-418N.

Figure 5:
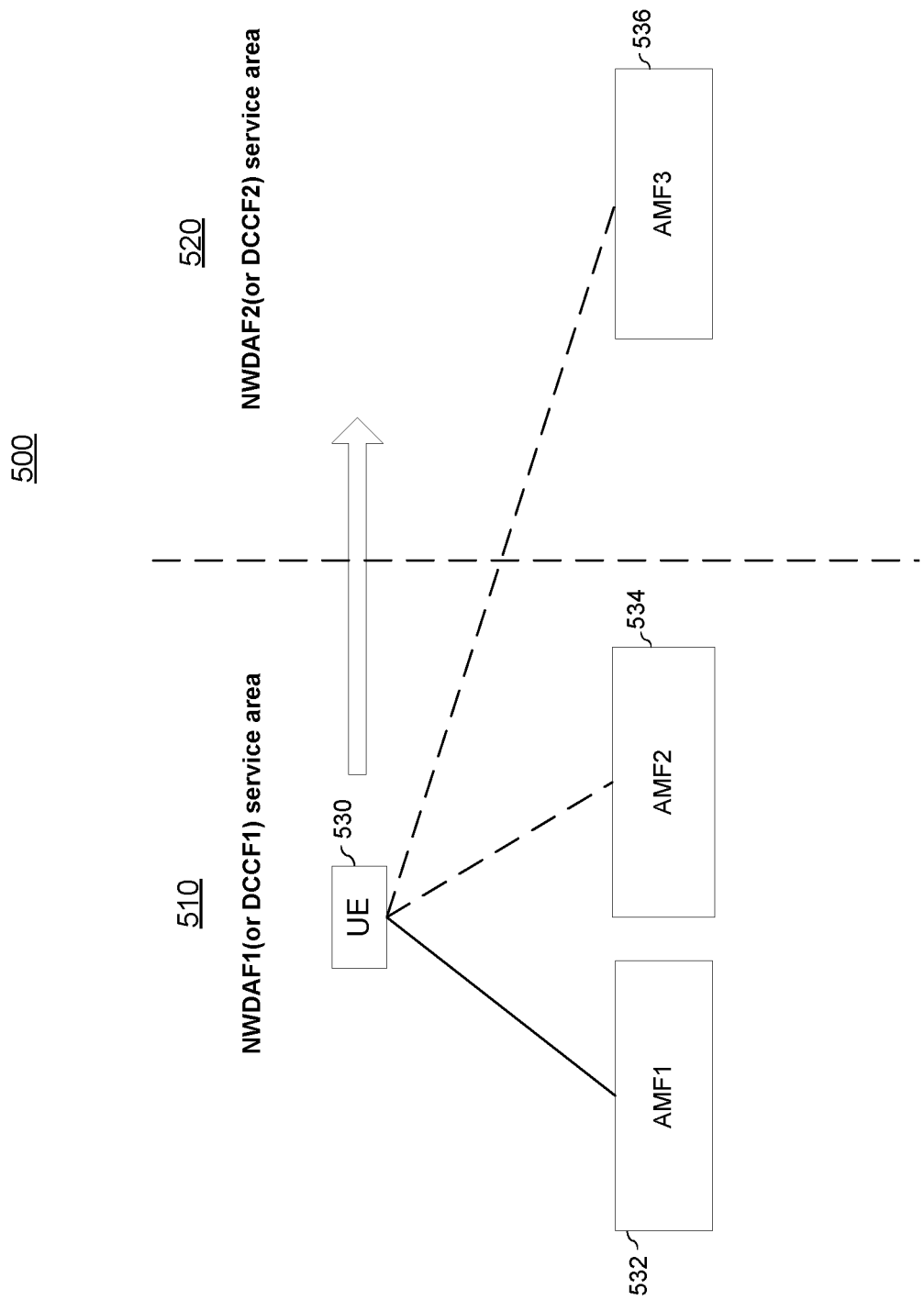
FIG. 5 depicts an example of changing application functions (AFs) as a mobile device that moves from one service area to another, in accordance with some example embodiments.

FIG. 5 depicts a mobile device that moves from one service area to another. As shown in FIG. 5, UE 530 is connected to AMF 532. As UE 530 moves, it will connect next to AMF 534, and then to AMF 536. AMFs 532 and 534 are in service area 510 served by a NWDAF such as NWDAF 312 or a DCCF such as DCCF 412. AMF 536 is in service area 520 served by a NWDAF such as NWDAF 314 or DCCF such as DCCF 414. Disclosed are devices and techniques for determining that a data source has changed and for collecting the data from the new data source.

Figure 6:
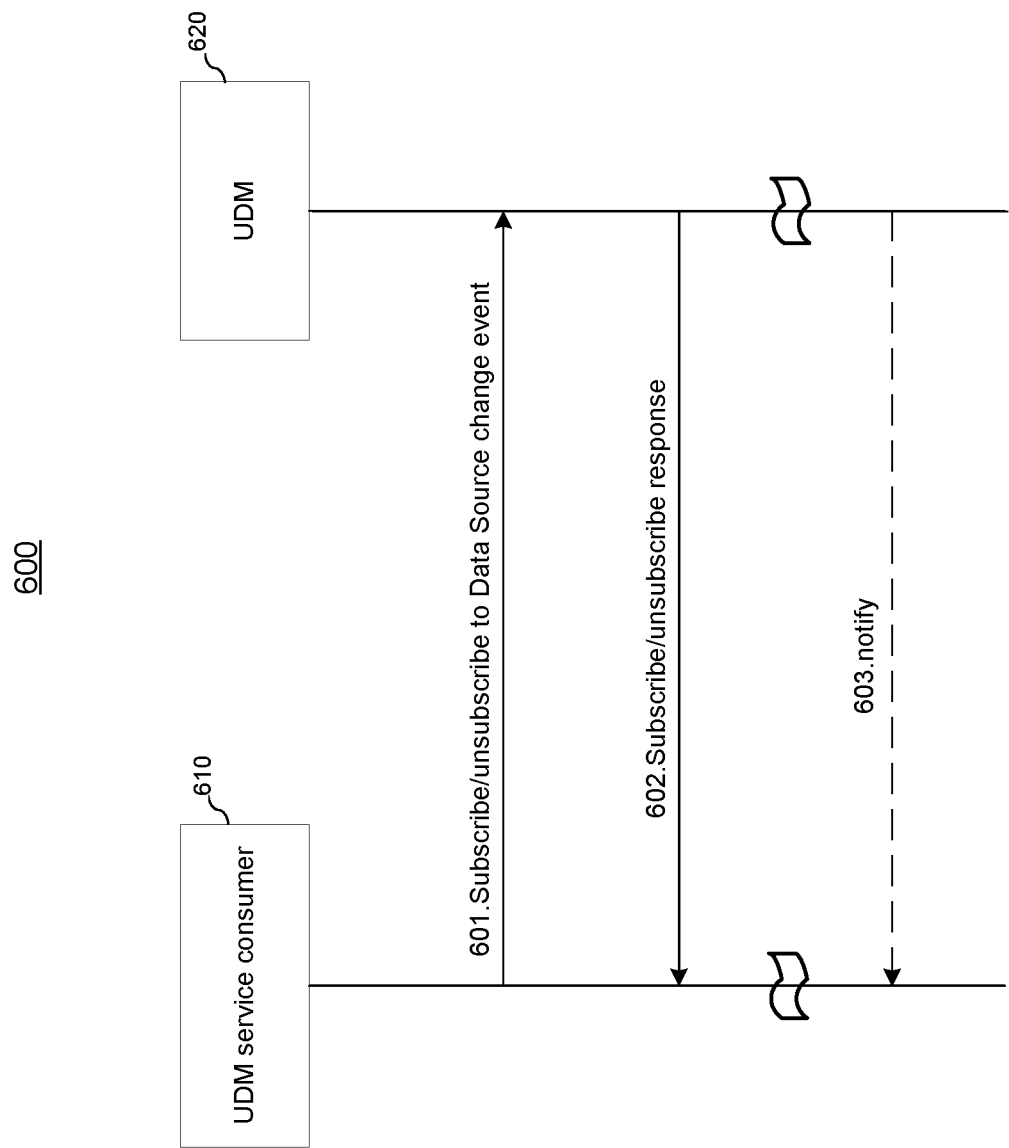
FIG. 6 depicts a subscription process, in accordance with some example embodiments.

Case 1 is shown in FIG. 6. FIG. 6 depicts a subscription process, in accordance with some example embodiments. Data consumer 610 subscribes to an application function 620 for service changes related to a UE. As shown in FIG. 6, data consumer 610 includes a UDM service consumer and application function 620 includes a UDM.

For example, at 601, a UDM service consumer 610 subscribes to a UDM 620 requesting notification(s) for "UE associated NF" event(s) (identified by event ID) for a UE or group of UEs and including the identifier(s) of UE(s) and/or other filter parameters (i.e. NF type(s), DNN, S-NSSAI). The UE associated NF event is detected by UDM 620. When the UDM detects that the NF(s) (according to request parameter NF type(s)) serving the UE or UE's PDU session are changed, the UDM may notify the UDM service consumer of NF(s) identifier related information.

At 602, the UDM 620 acknowledges and responds to the subscription request.

At 603, depending on the event, the UDM 620 detects the NF(s) requested at 601 has changed, and sends an event report to the UDM service consumer 610.

Figure 7:
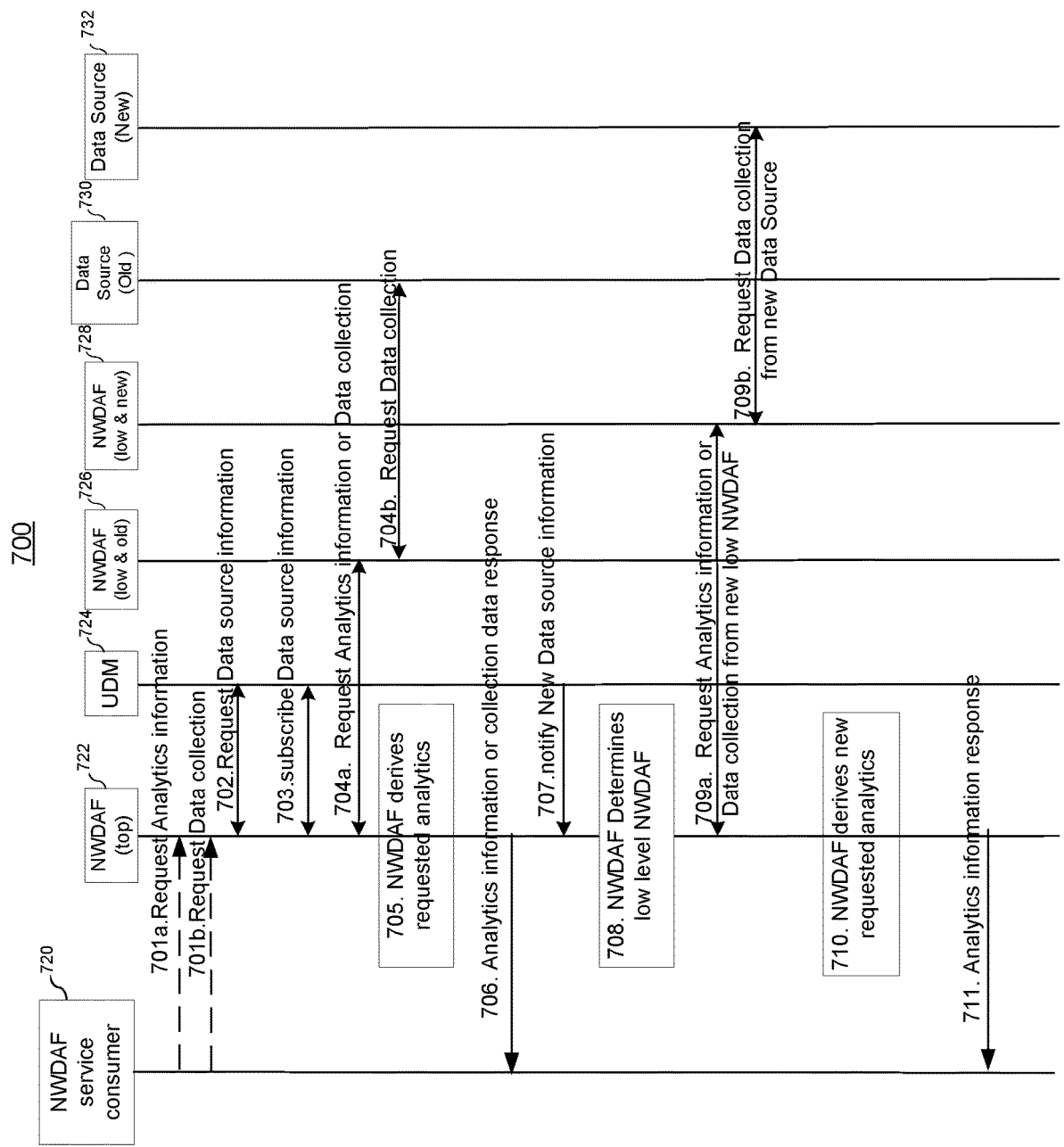
FIG. 7 depicts a process for an NWDAF to collect data from lower level NWDAFs, in accordance with some example embodiments.

In case 2 depicted in FIG. 7, the UE moves from an old data source service area to new data source service area. The old data source(s) are serviced by an old low level NWDAF and the new data source(s) are serviced by new NWDAF. The top NWDAF receives notification of a change of the NF serving a UE via a subscription event in UDM.

When the NWDAF receives a data analytics request or a data collection request, the NWDAF determines an NF(s) serving the UE and subscribes in UDM for "UE associated NF events." The NWDAF may request to data collection from the data source(s) (according to the UDM indication) via the old lower level NWDAF or request to analytics generation by the old lower level NWDAF. When the NWDAF receives a notification of a "UE associated NF event" including the new data source(s) information, the NWDAF determines that the new data source(s) is not in the old low level NWDAF service area and determines which NWDAF services the new data source(s) (such as a new low level NWDAF). The NWDAF then sends the analytics information request to the new low level NWDAF.

At 701a, NWDAF service consumer 720 may send a request to the NWDAF 722 for analytics information including a requested type of analytics.

At 701b, NWDAF service consumer 820 may also send a request to the NWDAF 722 for data collection.

At 702, NWDAF 722 determines which data source(s) are serving the UE according to the information retrieved from UDM 724. In this case, the old data source 730 is serving UE by providing data.

At 703, the NWDAF subscribes "UE associated NF event" in UDM including identifier of UE(s) and/or the NF type(s).

At 704, the NWDAF 722 sends a request to the old lower level NWDAF 726 for analytics information or data collection including old data source(s) information received at 702.

The NWDAF 722 queries the NRF and/or UDM to determine which lower level NWDAF is serving the data source(s) retrieving from the UDM 724 at 702. In this case, the old lower level NWDAF 726 is serving the old data source 730.

The old lower level NWDAF 726 receives the request 704a and collects data from the old data source(s). If the request is for analytics information, the old lower level NWDAF 726 shall derive requested analytics. Then the old lower level NWDAF 726 responds to the NWDAF 722 with the analytics information or data collection according the request.

At 705, the NWDAF 722 derives requested analytics or aggregates received data according to the request in 701a/b.

At 706, the NWDAF 722 responds to the NWDAF service consumer 720 according the request in 701a/b.

At 707, the NWDAF 722 receives an event notification which was subscribed at 703 including the new data source(s) information.

At 708, the NWDAF 722 determines which NWDAF services the new data source(s) 732 (i.e. querying the NRF and/or UDM including the new data source(s) information). In this case, the new low level NWDAF 728 services the new data source(s) 732.

At 709a, the NWDAF may send a request to the new lower level NWDAF 728 for analytics information or data collection including data source(s) information received at 707.

At 709b, the new lower level NWDAF 728 collects data from the new data source(s) 732. If the request is for analytics information, the new lower level NWDAF 728 shall derive requested analytics. Then the new lower level NWDAF 728 responds to the NWDAF 722 with the analytics information or data collection according the request.

At 710, the NWDAF 722 derives requested analytics or aggregates requested data according the request 701a/b.

At 711, the NWDAF 722 responds to the NWDAF service consumer according the request at 701a/b.

Figure 8:
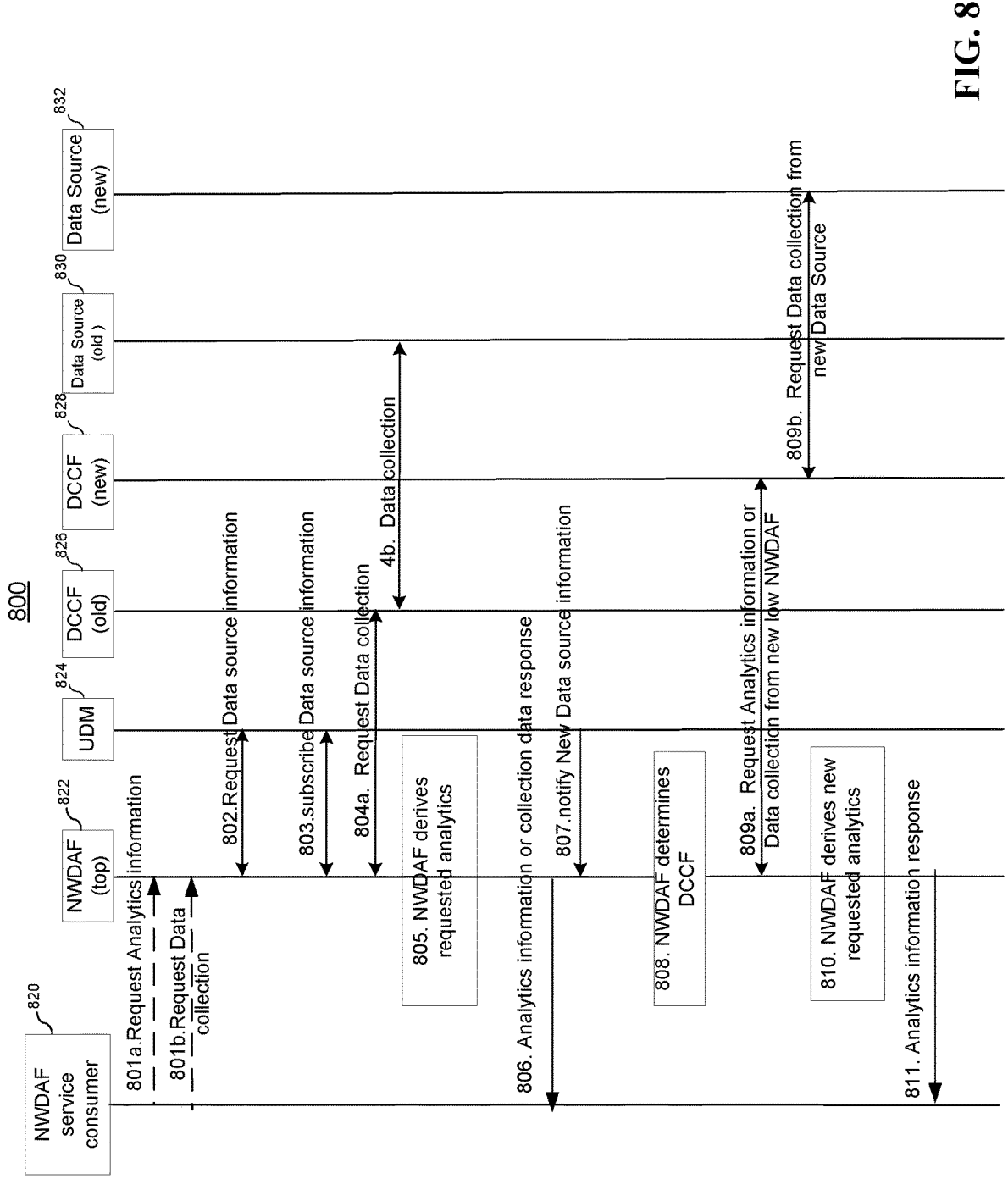
FIG. 8 depicts an NWDAF that collects data from DCCF(s), in accordance with some example embodiments.

In case 3 depicted in FIG. 8, DCCF(s) are deployed and the NWDAF may collect data via the DCCF(s). The UE may move from an old data source service area to a new data source service area. The old data source(s) are serviced by an old DCCF and the new data source(s) are serviced by a new DCCF. The NWDAF receives information about the NF serving the UE changed via a subscription event from the UDM.

At 801*a*, NWDAF service consumer 820 may send a request to the NWDAF 822 for analytics information including a requested type of analytics.

At 801*b*, NWDAF service consumer 820 may also send a request to the NWDAF 822 for data collection.

At 802, NWDAF 822 determines which data source(s) are serving the UE according to the information retrieved from the UDM 824. In this case, the old data source 830 is providing data to the UE.

At 803, the NWDAF 822 subscribes at the UDM 824 for UE associated NF events including identifier(s) of UE(s) and/or NF type(s).

At 804*a/b*, the NWDAF may query the NRF for which DCCF is serving the old data source(s) 830. In this case, the old DCCF 826 is serving the old data source(s) 830.

At 804*a*, the NWDAF sends a request to the old DCCF 826 for data collection.

At 804*b*, the old DCCF 826 collects data from the old data source(s) 830 and responds including the collected data to the NWDAF 822 according the request.

At 805, the NWDAF 822 derives the requested analytics or aggregates the requested data collection according the request at 801*a/b*.

At 806, the NWDAF 822 responds to the NWDAF service consumer 820 according the request at 801*a/b*.

At 807, the NWDAF 8722 receives the event notification which was subscribed At 803 including the new data source(s) information.

At 808, the NWDAF 822 determines which DCCF services the new data source(s) 832 (i.e. querying the NRF and/or UDM including the new data source(s) information). In this case, the new DCCF 828 services the new data source(s) 832.

At 809*a*, the NWDAF 822 sends a request to the new DCCF 832 for data collection.

At 809*b*, the new DCCF 828 collects data from the new data source(s) 832 and responds to the NWDAF 822 with the collected data according the request.

At 810, the NWDAF 822 derives the requested analytics or aggregates the requested data collection according the request at 801*a/b*.

At 811, the NWDAF 822 responds to the NWDAF service consumer 820 according the request at 801*a/b*.

Figure 9:
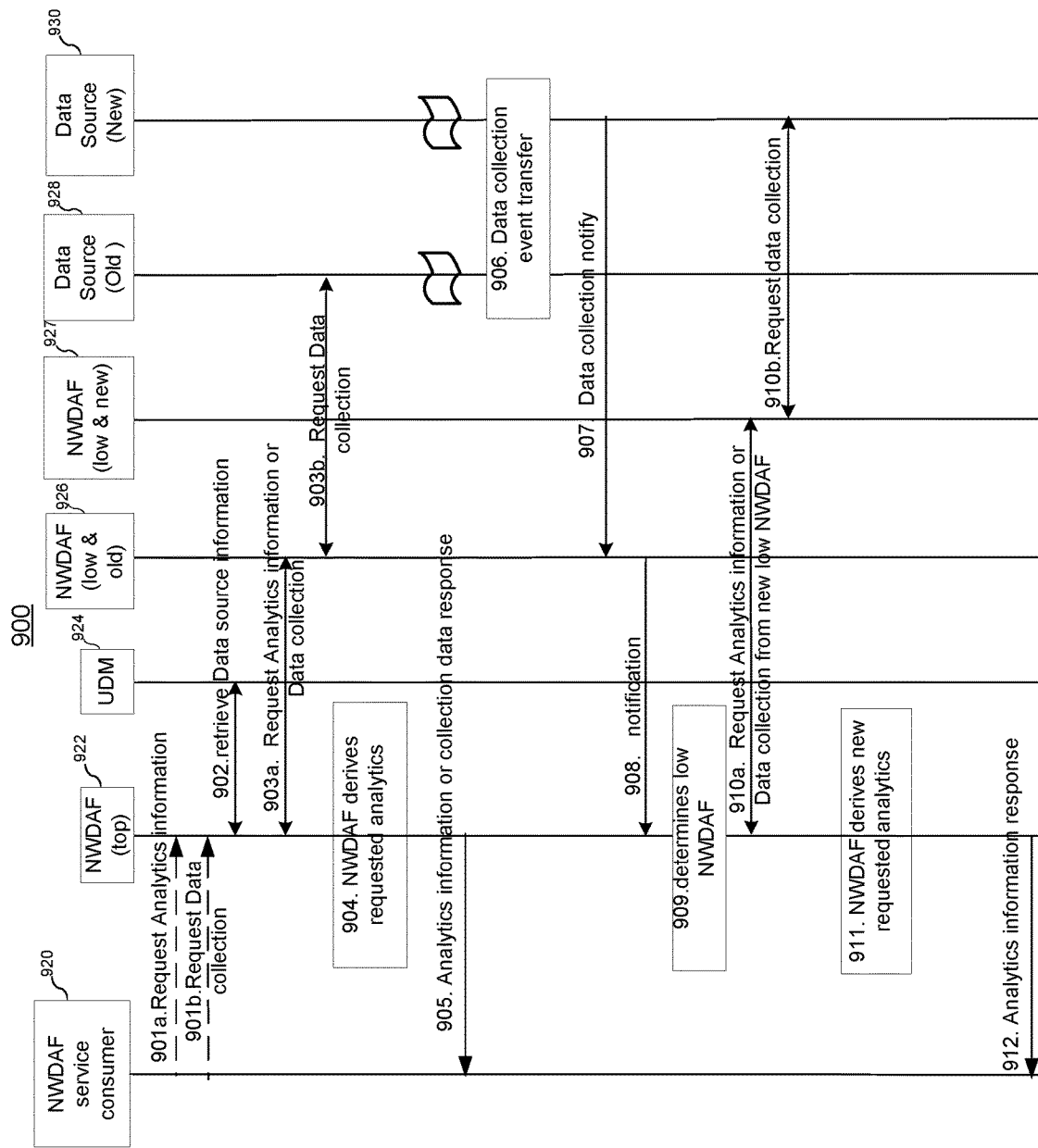
FIG. 9 depicts an example process similar to FIG. 7 with a top NWDAF having information indicating that a data source(s) has changed, in accordance with some example embodiments.

Case 4 depicted in FIG. 9 is similar to case 2 shown in FIG. 7, but the top NWDAF has information indicating that the data source(s) has changed and the new data source(s) is not associated with the old low level NWDAF service area according to a message from the old low level NWDAF.

Elements 901-905 are similar to elements 701, 702, and 704-706 in FIG. 7. The top NWDAF 922 need not subscribe to UDM 924.

At 901*a*, NWDAF service consumer 920 may send a request to the NWDAF 922 for analytics information including a requested type of analytics.

At 901*b*, NWDAF service consumer 920 may also send a request to the NWDAF 922 for data collection.

At 902, NWDAF 922 determines which data source(s) are serving the UE according to information retrieved from UDM 924. In this case, the old data source is serving UE by providing data.

At 903, the NWDAF 922 sends a request to the old lower level NWDAF 926 for analytics information or data collection including data source(s) information received in 902.

The NWDAF 922 may query the NRF and/or UDM for information about which lower level NWDAF is serving the old data source(s) 928. In this case, the old lower level NWDAF 926 is serving the old data source 928.

The old lower level NWDAF 926 receives the request and collects data from the old data source(s) 928 via a data collection subscription event. If the request is for analytics information, the old lower level NWDAF 926 shall derive requested analytics. Then the old lower level NWDAF 926 sends the analytics information or collection data to the NWDAF 922 according the request.

At 904, the NWDAF 922 derives requested analytics or aggregates requested collection data according the request at 901*a/b*.

At 905, the NWDAF 922 responses to the NWDAF service consumer 920 according the request at 901*a/b*.

At 906, when the UE moves from old data source(s) 928 service area to new data source(s) service area, the UE's context including the subscription event in old data source transfers to the new data source.

At 907, the new data source(s) send the UE related data according to the subscription event request to the old low level NWDAF 926.

At 908, the old low level NWDAF 926 determines that the new data source(s) 930 is not in its service area and sends a message to NWDAF 922 according the request at 903*a* including the new data source(s) information.

At 909, the NWDAF 922 determines which NWDAF services the new data source(s) 930 (i.e. querying the NRF and/or UDM including the new data source(s) information). In this case, the new data source 930 is served by the new low level NWDAF 927.

At 910, the NWDAF sends a request to the new low level NWDAF 927 for analytics information or data collection including new data source(s) information.

The new lower level NWDAF 927 receives the request and collects data from the new data source(s). If the request is for analytics information, the new lower level NWDAF 927 shall derive requested analytics. Then the new lower level NWDAF 927 responds with the analytics information or collection data to the NWDAF 922 according the request.

At 911, the NWDAF 922 derives the requested analytics or aggregates the requested collection data according the request at 901*a/b*.

At 912, the NWDAF 922 responds to the NWDAF service consumer 920 according the request at 901*a/b*.

Figure 10:
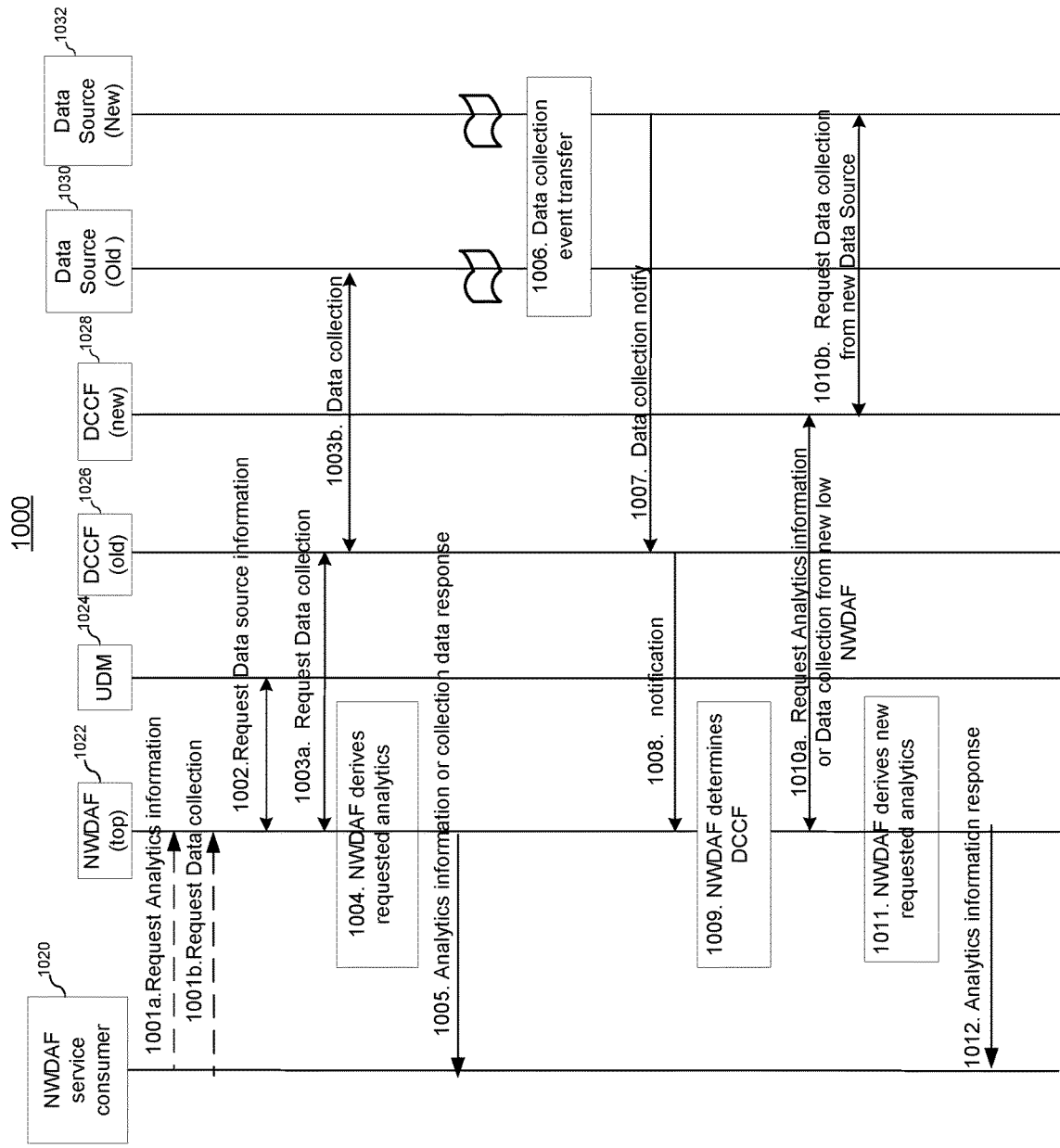
FIG. 10 depicts an example process similar to FIG. 8 with the top NWDAF having information indicating that the data source(s) has changed, in accordance with some example embodiments.

Case 5 depicted in FIG. 10 is similar to case 3, where the top NWDAF has information indicating that the data source(s) has changed and the new data source(s) is not in the old low level DCCF service area according to a message from the old low level DCCF.

Elements 1001-1005 are similar to elements 801, 802, 804-806 in case 3 shown in FIG. 8. The top NWDAF need not subscribe to the UDM.

At 1001*a*, the NWDAF service consumer 1020 may send a request to the NWDAF 1022 for analytics information including a requested type of analytics.

At 1001*b*, the NWDAF service consumer 1020 may send a request to the NWDAF 1022 for data collection.

At 1002, the NWDAF 1022 determines which data source(s) are serving the UE according to the information retrieved from UDM 1024. In this case, the old data source 1030 is serving UE by providing data.

At 1003*a/b*, the NWDAF 1022 may query the NRF for which DCCF is serving the old data source(s) 1030. In this case, the old DCCF 1026 is serving the old data source(s) 1030.

At 1003*a*, the NWDAF 1022 sends a request to the old DCCF 1026 for data collection.

At 1003*b*, the old DCCF 1026 collects data from the old data source(s) 1030 via a data collection subscription event and feeds back the collected data to the NWDAF 1022 according the request.

At 1005, the NWDAF 1022 derives requested analytics or aggregates requested collection data according to the request at 1001*a/b*.

At 1006, when the UE moves from the old data source(s) 1030 in an old service area to a new data source(s) in a new service area, the UE's context including the subscription event in the old data source transfers to the new data source.

At 1007, the new data source(s) 1032 sends the UE related data according to the subscription event received at 1006 to the old DCCF 1026.

At 1008, the old DCCF 1026 determines that the new data source(s) 1032 is not in the service area of the old DCCF 1026 and sends a message to NWDAF 1022 according to the request at 1003*a* including the new data source(s) information.

At 1009, the NWDAF 1022 determines which DCCF services the new data source(s) 1032 (i.e., querying the NRF and/or UDM including the new Data Source(s) information). In this case, the new data source is served by the new DCCF 1028.

At 1010, the NWDAF 1022 sends a request to the new DCCF 1028 for data collection.

The new DCCF 1028 collects data from the new data source(s) 1032 and feeds back collection data to the NWDAF 1022 according the request At 1011, the NWDAF 1022 derives the data analytics or aggregates the requested collection data requested by the NWDAF service consumer 1020 according the request at 1001*a/b*.

At 1012, the NWDAF responds to the NWDAF service consumer 1020 according the request at 1001*a/b*.

Figure 11:
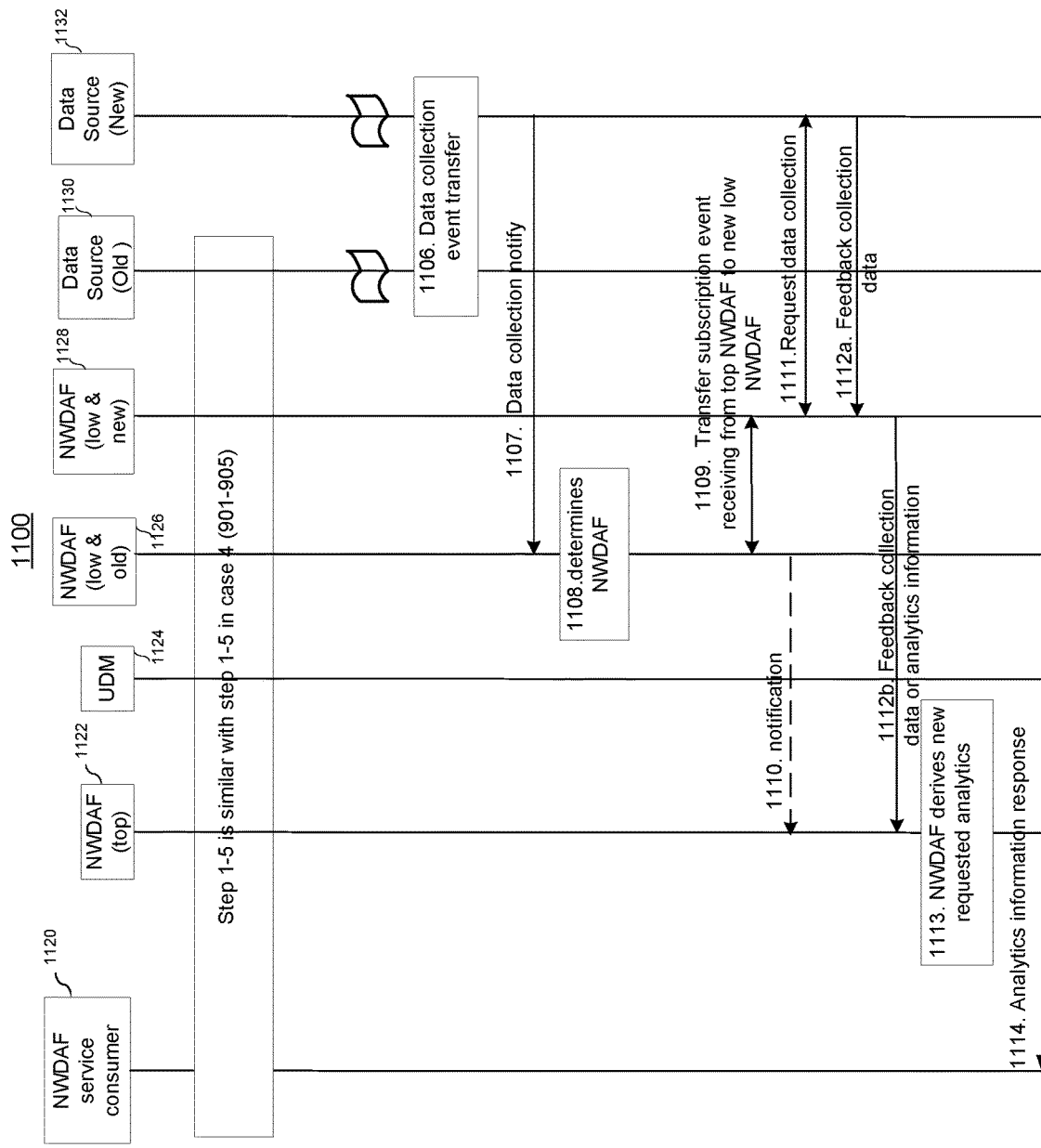
FIG. 11 depicts an example process similar to FIG. 9 with the old low level NWDAF determining which NWDAF services the new data source, in accordance with some example embodiments.

Case 6 depicted in FIG. 11 is similar to case 4, but the old low level NWDAF determines which NWDAF services the new data source and transfers the request to the new low level NWDAF received from the top NWDAF. Elements 1101-1107 are similar with elements 901-907 in case 4.

At 1108, the old low level NWDAF 1126 determines that the new data source(s) 1132 is not in the service area of NWDAF 1126 and determines which NWDAF is serving the new data source(s) 1132 (i.e. querying from the NRF or UDM). In this case, the new low level NWDAF 1128 services the new data source(s) 1132.

At 1109, the old low level NWDAF 1126 transfers the request received from the top NWDAF 1122 at 1003*a* in FIG. 10 to the new low level NWDAF 1128.

The old low level NWDAF 1126 may also transfer the UE related information previously received from the old data source(s) 1130, data analytics information it derived before the transfer to the new low level NWDAF 1128.

At 1110, the old low level NWDAF 1126 may notify the top NWDAF 1122 of the request to transfer to the new low level NWDAF 1128.

At 1111, the new low level NWDAF 1128 sends a request to the new data source(s) 1132 for data collection.

At 1112, the new data source(s) 1132 feeds data to the new low level NWDAF 1128 according the request at 1111.

If the request at 1109 is for analytics information, the new lower level NWDAF 1128 shall derive the requested analytics according to collection data from the new data source(s) 1132. Then the new lower level NWDAF 1128 feeds back the analytics information or collection data to the top NWDAF 1122 according the request at 1109.

At 1113, the NWDAF 1122 derives requested analytics or aggregates requested collection data according the request at 901*a/b* shown at FIG. 9.

At 1114, the NWDAF 1122 responds to the NWDAF service consumer 1120 according the request at 901*a/b* in FIG. 9.

Figure 12:
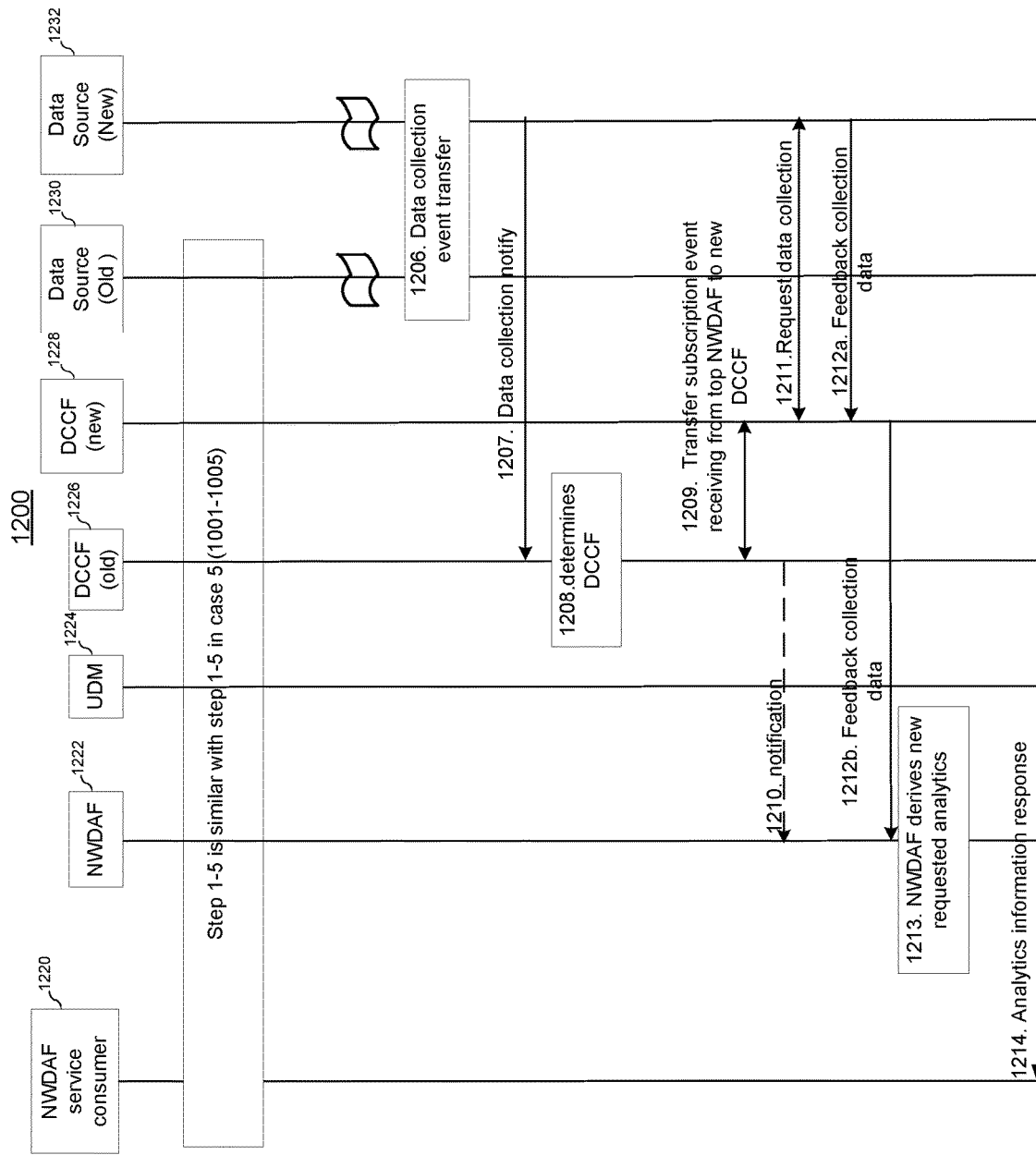
FIG. 12 depicts an example process similar to FIG. 10 where the old DCCF determines which DCCF services the new data source, in accordance with some example embodiments.

Case 7 depicted in FIG. 12 is similar with case 5, but the old DCCF determines which DCCF services the new data source and transfers the request received from the top NWDAF to the new DCCF.

Elements 1201-1207 are similar to elements 1001-1007 in case 5 shown in FIG. 10.

At 1208, the old DCCF 1226 determines that the new data source(s) 1232 is not in the service area of old DCCF 1226 and determines which DCCF is serving the new data source(s) 1232 (i.e. querying from the NRF or UDM). In this case, the new DCCF 1228 services the new data source(s) 1232.

At 1209, the old DCCF 1226 transfers the request received from the top NWDAF at 1003*a* of FIG. 10 to the new DCCF 1228.

The old DCCF 1226 may also transfer the UE related information previously received from the old data source(s) 1230 to the new DCCF 1228.

At 1210, the old DCCF 1226 may notify the top NWDAF 1222 of the request to transfer to the new DCCF 1228.

At 1211, the new DCCF 1228 sends a request to the new data source(s) 1232 for data collection.

At 1212, the new data source(s) feeds data to the new DCCF 1228 according the request at 1211.

The new DCCF 1228 feeds collection data to the top NWDAF 1222 according the request at 1209.

At 1213, the NWDAF 1222 derives requested analytics or aggregates requested collection data according the request at 1110*a/b* shown in FIG. 10.

At 1214, the NWDAF responds to the NWDAF service consumer 1220 according the request at 1110*a/b* shown in FIG. 10.

In some example embodiments related to cases 1-3 described above, one or more of the following features are included.

1) For a UDM, a new monitoring event "UE associated N" is introduced to the UDM. The UDM detects the event that the NF(s) serving UE or UE's PDU session is changed and notifies the consumer according the subscribe request.

2) For a NWDAF, the NWDAF subscribes to the UDM for monitoring the UE(s) associated NF including the event ID (i.e. "UE associated NF"), identifier of UE(s), when the NWDAF received analytics information request or data collection request.

The NWDAF receives the notification that UE(s) associated NF(s) are changed with the new Data Source(s) information. The NWDAF performs, such as:

a) Requesting the new lower level NWDAF for data analytics information or data collection. Before sending the request message, the NWDAF determines which NWDAF services the new Data Source(s)(i.e. querying the NRF and/or UDM including the new Data Source(s) information); or b) Requesting the DCCF for data collection. Before sending the request message, the NWDAF may query the NRF and/or UDM which DCCF is serving the new UE(s) associated NF(s).

In some example embodiments related to cases 4 and 5 described above, the following features are included.

1) A low level NWDAF or DCCF determines that the data source(s) providing collection data is not in its service area, then notifies the top NWDAF that the data source(s) has changed including the new data source(s) information,
2) For a top NWDAF:
   a) receiving the message that the Data Source(s) has changed, the NWDAF queries the NRF or UDM which NWDAF or DCCF serving the new Data Source(s); (NRF feedbacks the new NWDAF information i.e. new low level NWDAF or new DCCF);
   b) sends data collection or analytics information request to the new low level NWDAF or DCCF; and/or
   c) receives collection data or analytics information from new low NWDAF or new DCCF;

In some example embodiments related to cases 6 and 7 described above, the following features are included.
1) A low level NWDAF or DCCF:
   a) determines that the data source(s) providing collection data is not in its service area, then queries the NRF or UDM which NWDAF or DCCF serving the new data source(s); NRF feedbacks the new NWDAF information i.e. new low level NWDAF or new DCCF;
   b) transfers the request receiving from the top NWDAF to the new low level NWDAF or new DCCF;
   c) transfers the collection data or analytics information previously to the new low level NWDAF or new DCCF; and/or
   d) notifies the top NWDAF that the top NWDAF request is changed to the new low level NWDAF or new DCCF.

Figure 13:
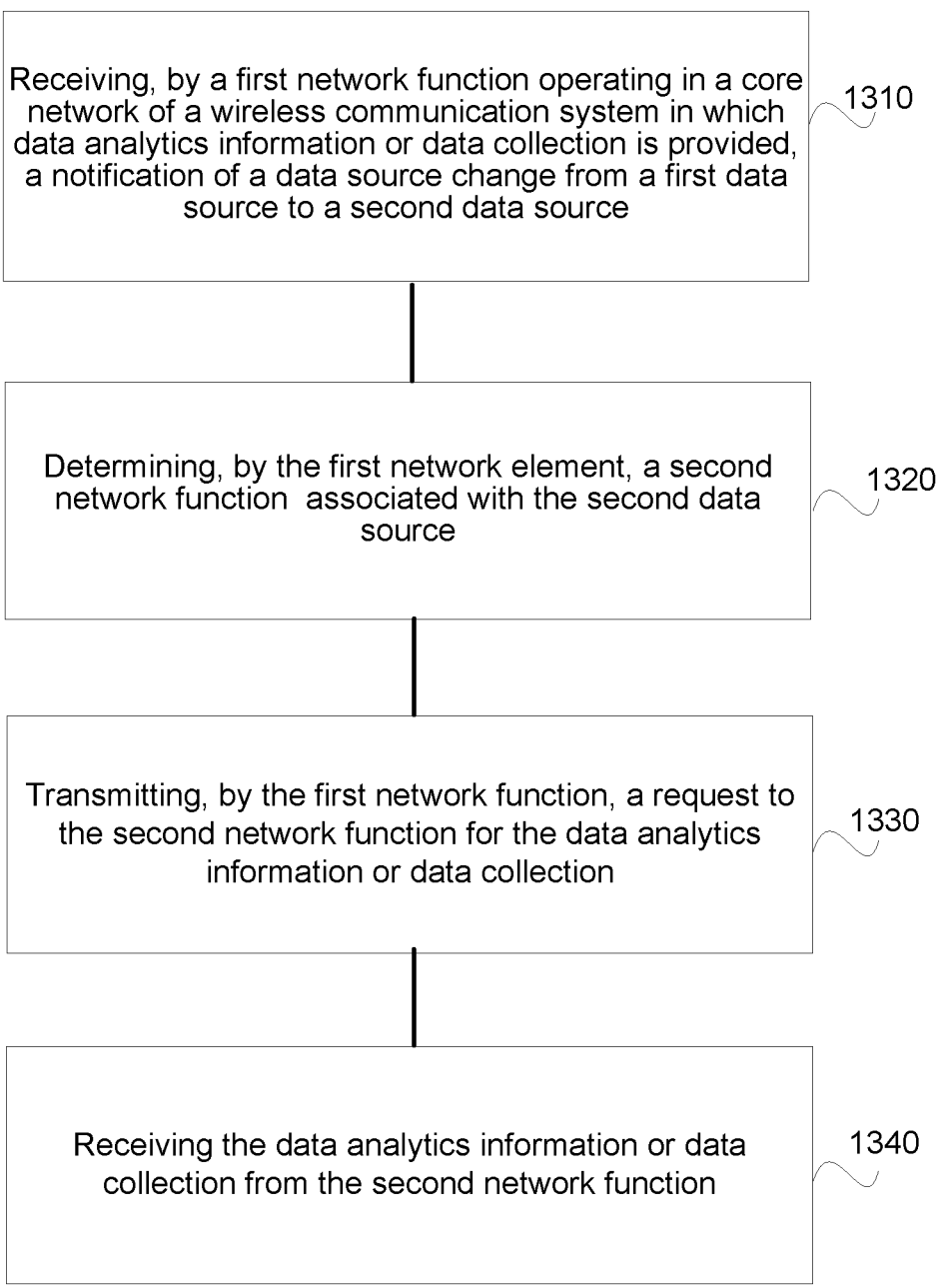
FIG. 13 depicts an example of a method, in accordance with some example embodiments.

FIG. 13 depicts an example of a method, in accordance with some example embodiments. At 1310, the method includes receiving, by a first network function operating in a core network of a wireless communication system in which data analytics information or data collection is provided, a notification from a second network function of a data source change from a first data source to a second data source. At 1420, the method includes determining, by the first network element, a second network function associated with the second data source. At 1330, the method includes transmitting, by the first network function, a request to the second network function for the data analytics information or data collection. At 1340, the method includes receiving the data analytics information or data collection from the second network function. In some example embodiments, the first network function is an NWDAF such as a top NWDAF, and the second network function is an old lower NWDAF or old DCCF.

FIG. 14 depicts an example of a method, in accordance with some example embodiments. At 1410, the method includes receiving, by a first network function operating in a core network of a wireless communication system in which data analytics information or data collection is provided, a notification of a data source change from a first data source to a second data source. At 1420, the method includes determining, by the first network function, from the received notification a third network function associated with the second data source. At 1430, the method includes transmitting, by the first network function, a request to the third network function for the data analytics information or data collection. At 1440, the method includes receiving, by the first network function, the data analytics information or data collection from the third network function. In some example embodiments, the first network function is an NWDAF such as a top NWDAF, the second network function is an old lower NWDAF or old DCCF, and the third network function is a new lower NWDAF or new DCCF.

FIG. 15 depicts an example of a method, in accordance with some example embodiments. At 1510, the method includes determining, by a first network function operating in a core network of a wireless communication system in which data analytics information or data collection is provided, a second network function associated with the second data source. At 1520, the method includes transferring a request to data analytics information or data collection received from a third network function related to a mobile device from the first network function to the second network function. At 1530, the method includes transmitting, by the first network function to the third network function, a notification of the transferring. At 1540, the method includes receiving, the data analytics information or collection data from the second network function. In some example embodiments, the first network function is an old lower NWDAF or old DCCF, the second network function is a new lower NWDAF or new DCCF, and the third network function is an NWDAF such as a top NWDAF.

Figure 16:
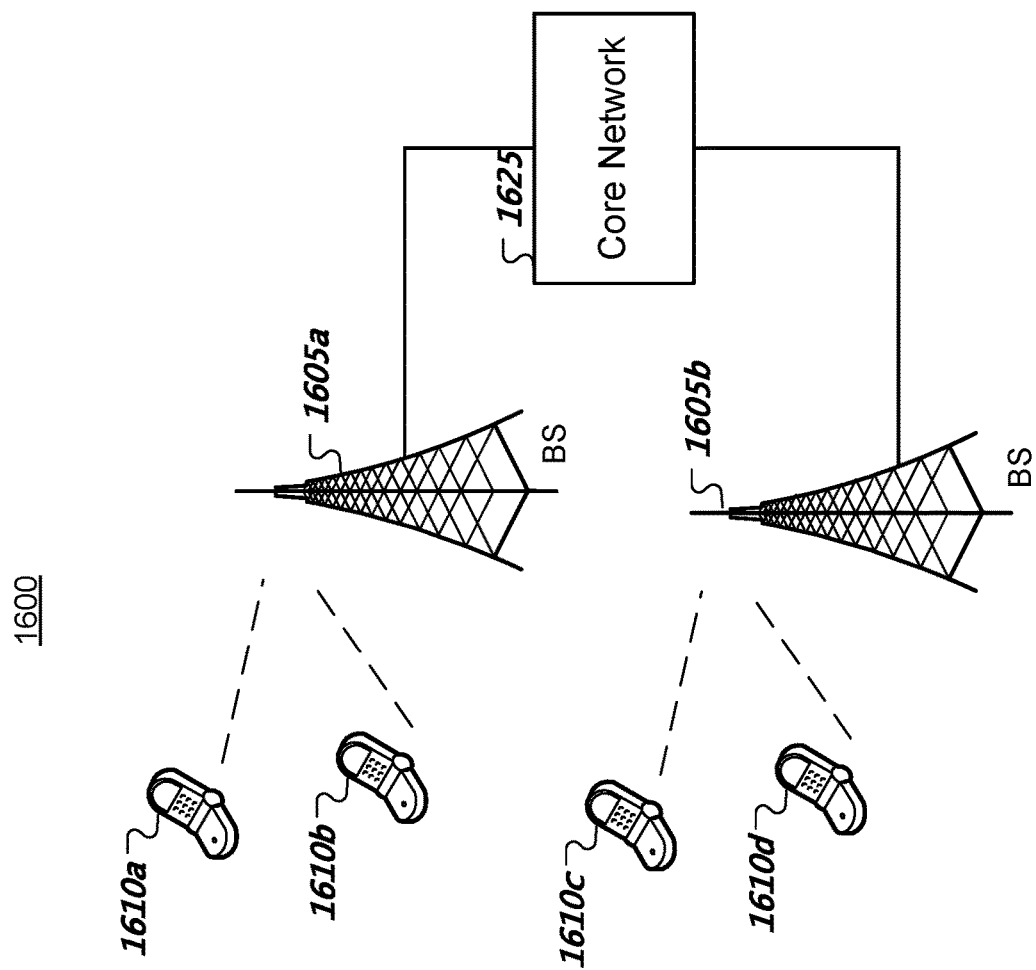
FIG. 16 depicts an example of a wireless communication system, in accordance with some example embodiments.

FIG. 16 shows an example of a wireless communication system 1600 where techniques in accordance with one or more embodiments of the present technology can be applied. A wireless communication system 1600 can include one or more base stations (BSs) 1605a, 1605b, one or more wireless devices 1610a, 1610b, 1610c, 1610d, and a core network 1625. A base station 1605a, 1605b can provide wireless service to wireless devices 1610a, 1610b, 1610c and 1610d in one or more wireless sectors. In some implementations, a base station 1605a, 1605b includes directional antennas to produce two or more directional beams to provide wireless coverage in different sectors.

The core network 1625 can communicate with one or more base stations 1605a, 1605b. The core network 1625 provides connectivity with other wireless communication systems and wired communication systems. The core network may include one or more service subscription databases to store information related to the subscribed wireless devices 1610a, 1610b, 1610c, and 1610d. A first base station 1605a can provide wireless service based on a first radio access technology, whereas a second base station 1605b can provide wireless service based on a second radio access technology. The base stations 1605a and 1605b may be co-located or may be separately installed in the field according to the deployment scenario. The wireless devices 1610a, 1610b, 1610c, and 1610d can support multiple different radio access technologies. The techniques and embodiments described in the present document may be implemented by the base stations, other network entities, and/or by wireless devices described in the present document, or a combination of base station and mobile device equipment.

Figure 17:
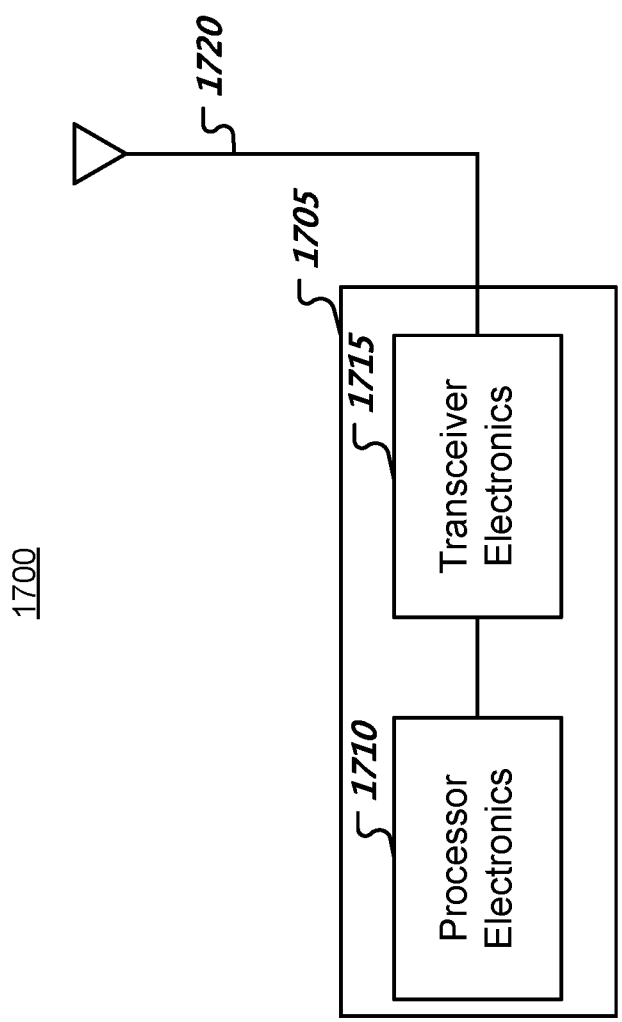
FIG. 17 depicts an example block diagram of a portion of a radio system, in accordance with some example embodiments.

FIG. 17 is a block diagram representation of a portion of a radio station in accordance with one or more embodiments of the present technology can be applied. A radio station 1705 such as a base station, other network entity, or a wireless device (or UE) can include processor electronics 1710 such as a microprocessor that implements one or more of the wireless techniques presented in this document. The radio station 1705 can include transceiver electronics 1715 to send and/or receive wireless signals over one or more communication interfaces such as antenna 1720. The radio station 1705 can include other communication interfaces for transmitting and receiving data. Radio station 1705 can include one or more memories (not explicitly shown) configured to store information such as data and/or instructions.

In some implementations, the processor electronics 1710 can include at least a portion of the transceiver electronics 1715. In some embodiments, at least some of the disclosed techniques, modules or functions are implemented using the radio station 1705. In some embodiments, the radio station 1705 may be configured to perform the methods described herein.

It will be appreciated that the present document discloses techniques that can be embodied in various embodiments to establish and manage multicast sessions in various scenarios. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A wireless communication method, comprising:
   receiving, by a first network function operating in a core network of a wireless communication system, a user equipment related data from a second data source;
   determining, by the first network function, that the second data source is not within a service area of the first network function and that a second network function is associated with the second data source;
   transferring a request to obtain data analytics information or data collection from the first network function to the second network function, wherein the request is received from a third network function related to a mobile device; and
   transmitting, by the first network function to the third network function, a notification of the request being transferred to the second network function.

2. The method of claim 1, wherein the third network function is a Network Data Analytics Function (NWDAF), the first network function is an old lower level NWDAF, wherein the old lower level NWDAF is lower in a logical hierarchy than the NWDAF, and wherein the second network function is a new lower level NWDAF at a same logical hierarchy level as the old lower level NWDAF.

3. The method of claim 1, wherein the third network function is a Network Data Analytics Function (NWDAF), the first network function is an old lower level Data Collection Coordination Function (DCCF), wherein the old lower level DCCF is lower in a logical hierarchy than the NWDAF, and wherein the second network function is a new lower level DCCF at a same logical hierarchy level as the old lower level DCCF.

4. The method of claim 1, wherein the determining includes requesting from a Network Repository Function (NRF) or a Unified Data Management (UDM) an indication of a new lower level Network Data Analytics Function (NWDAF) or a new lower level Data Collection Coordination Function (DCCF) that serves the second data source.

5. The method of claim 1, further comprising:
transferring a previously received user equipment related information and previously received data analytics information from the first network function to the second network function, wherein the previously received data analytics information is received from a first data source.

6. A communication apparatus, comprising a processor configured to implement a method, comprising:
receiving, by a first network function operating in a core network of a wireless communication system, a user equipment related data from a second data source;
determining, by the first network function, that the second data source is not within a service area of the first network function and that a second network function is associated with the second data source;
transferring a request to obtain data analytics information or data collection from the first network function to the second network function, wherein the request is received from a third network function related to a mobile device;
transmitting, by the first network function to the third network function, a notification of the request being transferred to the second network function.

7. The communication apparatus of claim 6, wherein the third network function is a Network Data Analytics Function (NWDAF), the first network function is an old lower level NWDAF, wherein the old lower level NWDAF is lower in a logical hierarchy than the NWDAF, and wherein the second network function is a new lower level NWDAF at a same logical hierarchy level as the old lower level NWDAF.

8. The communication apparatus of claim 6, wherein the third network function is a Network Data Analytics Function (NWDAF), the first network function is an old lower level Data Collection Coordination Function (DCCF), wherein the old lower level DCCF is lower in a logical hierarchy than the NWDAF, and wherein the second network function is a new lower level DCCF at a same logical hierarchy level as the old lower level DCCF.

9. The communication apparatus of claim 6, wherein the determining includes requesting from a Network Repository Function (NRF) or a Unified Data Management (UDM) an indication of a new lower level Network Data Analytics Function (NWDAF) or a new lower level Data Collection Coordination Function (DCCF) that serves the second data source.

10. The communication apparatus of claim 6, wherein the processor is further configured to perform the method that further comprises:
transferring a previously received user equipment related information and previously received data analytics information from the first network function to the second network function, wherein the previously received data analytics information is received from a first data source.

* * * * *